Nov. 17, 1942.   N. R. DAVIS ET AL   2,302,603
AUTOMATIC ELECTRIC REGULATOR
Filed Dec. 30, 1940

INVENTORS
NEVILLE RYLAND DAVIS
JAMES NEWTON WETHERILT
By Norris & Bateman
ATTORNEYS Patented Nov. 17, 1942

2,302,603

UNITED STATES PATENT OFFICE 2,302,603

AUTOMATIC ELECTRIC REGULATOR

Neville Ryland Davis, Bisham, and James Newton Wetherilt, Laleham-on-Thames, England Application December 30, 1940, Serial No. 372,420 In Great Britain December 18, 1939

14 Claims. (Cl. 200—122)

This invention relates to automatic regulators of the kind adapted to operate in association with an electric circuit which includes means for governing the magnitude of the quantity to be regulated, and in which the energisation of said circuit is alternately changed from one value to another, one of which values may be zero, under control of co-operating control elements of the regulator, the ratio of the lengths of the alternate periods at which said circuit is energised at the two values respectively (which ratio is hereinafter for convenience termed the "on/off ratio") being adjusted by a system responsive to the magnitude of the regulated quantity so as to maintain or tend to maintain said quantity at a desired mean value determined by the setting of the regulator. The desired value may be a predetermined constant value or an otherwise defined value such as according to a schedule or programme.

As one example of regulator of the kind above referred to may be mentioned thermostats as commonly employed for controlling temperature. The invention is eminently applicable to thermostats but has general application to regulators of the kind referred to for governing the magnitude of any quantity or condition which may be applied to the regulator to cause response thereof; for example, the invention may be applied to pressure or speed regulators and to regulators for governing the strength of solutions or constituency of fluids such as in manufacturing processes.

According to the invention, means are provided for automatically adjusting the setting of the regulator in response to changes in the mean position of the system responsive to the regulated quantity so that a given change in the on/off ratio of the regulator is maintained for a reduced change in the regulated quantity.

Since the on/off ratio of the regulator is dependent upon the position of the responsive system thereof, the change of setting may conveniently be effected by means responsive to said on/off ratio. The operation is then based on the changing of the setting with change of the on/off ratio until stability is achieved.

The invention provides a regulator of the kind referred to in which the tendency to overrun is reduced by the provision of an additional relative movement between the control elements, and if desired the differential is reduced, but in which at the same time the change of the regulated quantity with change of load on the controlled system is reduced due to the changing of the setting of the regulator as the means position of the responsive system changes. Said change of the setting of the regulator and the additional movement may be introduced by any suitable means which appropriately modify the positions of the responsive system at which the co-operating control elements of the regulator occupy respectively their extreme relative positions.

The co-operating control elements of the regulator may be of any suitable kind adapted to control the energisation of a circuit containing means for governing the magnitude of the regulated quantity. For example said elements may comprise contacts or condenser plates, which latter may conveniently be connected in the control circuit of an electric discharge tube device, or inductively related elements.

Several embodiments of the invention will now be described by way of example with reference to the accompanying drawing, the several figures of which show diagrammatically the arrangements of thermal responsive elements and heating windings of the respective embodiments.

Figure 1:
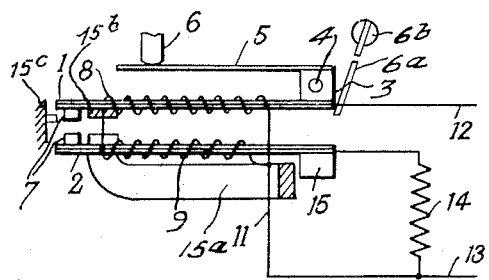
Figure 1 is a diagrammatic view of one form of regulator embodying the present invention.

In the arrangement shown in Fig. 1 the regulator comprises a pair of bimetal elements 1 and 2, of which the element 1 is fixed to a block 3 pivoted on a pin 4 and having also secured to it a rigid blade 5 which is connected with the main responsive element of the regulator, for example a stem type thermostat partly shown at 6, the blade 5 being biased upwardly into engagement with the member 6 by a spring blade 6a anchored at 6b. For convenience the regulator will in the following description be assumed to be a thermostat although the several embodiments of the invention shown in the drawing are applicable to regulators for other conditions than temperature by suitable modification of the main responsive element.

The bimetal elements 1 and 2 carry at their free ends co-operating control elements shown in the form of contacts 7 and the arrangement is such that upon fall of temperature the blade 5 is moved in the counter-clockwise direction so as to move the upper contact 7 downwardly in the figure. The elements 1 and 2 are provided with respective heating windings 8 and 9 which are connected in parallel with one another and at one end are connected with the element 2, as indicated at 10, whilst at their free ends said heating windings are connected by way of a conductor 11 with one of a pair of supply conductors 12 and 13 for energising the heating element, shown diagrammatically at 14, which is to be controlled by the thermostat. The supply conductor 12 is connected with the element 1 whilst the heating element 14 is connected between the element 2 and the supply conductor 13.

The bimetal 1 is arranged so that upon heating it moves its free end upwardly in the figure so as to tend to separate the contacts whilst the element 2 upon heating moves its free end upwardly so as to tend to engage the contacts, said element 2 being rigidly mounted at its right-hand end on a suitable fixed member 15.

It will be seen that in the regulator according to the invention there is provided in addition to the main responsive element 6 for causing movement of the contacts 7 in response to changes in the magnitude of the regulated quantity, means, comprising in Fig. 1 the bimetal element 1, for causing intermittent engagement of the contacts 7 at any position of the blade 5, and also means for causing further relative movement of the contacts 7, the latter means comprising in Fig. 1 the bimetal element 2. It will be appreciated that other means may be employed for causing intermittent engagement of the contacts 7 under control of said contacts and for providing said further relative movement of said contacts although the bimetal element arrangement shown is generally convenient.

In the operation of the arrangement shown in Fig. 1, the element 6 will operate so as to tend to close the contacts 7 when the temperature of the enclosure with which the element 14 is associated falls, and to open said contacts when the temperature rises. When the contacts 7 are closed the winding 8 is energised so that the bimetal 1 is heated and will eventually cause separation of said contacts. The bimetal 1 then cools down and recloses the contacts, and the latter are therefore maintained in a state of intermittent closure by the bimetal 1 for any position of the element 6 within the normal operating range and the on/off ratio of said intermittent contact closure will depend upon the position of said element 6. Thus, as the regulated temperature falls and the blade 5 is moved in the counterclockwise direction, the mean position of the upper contact 7, which is moved alternately upwardly and downwardly by the bimetal 1, will tend to move towards the lower contact 7, and consequently, the bimetal 1, in maintaining the intermittent contact closure, must be raised to a higher temperature which necessitates an increase in the on/off ratio of the contacts. The input to the heating circuit 14 is thus dependent upon the position of the element 6 in the required sense to correct for departures of the regulated temperatures from the desired value. The advantages of the arrangement employing means for maintaining the contacts in a state of intermittent closure over simple regulators in which the contacts are operated only by the main responsive system 6, and the operation of the bimetal element 2, are set forth in the following.

In the case of regulators in which the lower contact 7 is fixedly mounted there would in general be an appreciable change in the magnitude of the regulated quantity with change of the load on the control system. For convenience the case of a thermostat will hereinafter be considered, in which the regulated quantity is the temperature, of a room or enclosure for example, and the control system is an electrical heating circuit such as 14, as above described. It will be understood, however, that the considerations hereinafter set forth apply generally to regulators of the kind referred to for controlling any desired quantity, that is to say, the responsive element 6 in the arrangement of Fig. 1 may be arranged to respond to such quantity of any form.

In the case of a simple thermostat or other on/off regulator, that is to say, in which the upper contact 7 is operated directly by the main responsive element 6 whilst the lower contact 7 is fixed, the resultant energization of the heating circuit 14 depends upon the on/off ratio of said contacts 7 and this in turn depends upon the mean position of the main responsive element 6 and consequently there must be a change in the regulated temperature upon a change in the load. The amount of this change will depend inter alia upon the movement of the element 6 necessary to effect a given change in the on/off ratio. Theoretically in a simple thermostat the closeness of regulation under slowly changing load conditions may be substantially perfect since the movement of the temperature responsive system between its positions maintaining the cooperating control elements in relative positions energising the circuit constantly at the two different values respectively may be negligible. Where, however, means such as the bimetal element 1 are employed for introducing relative movement of the contacts 7 additionally to that imparted to said contacts by the element 6 so that said contacts are maintained in intermittent engagement, there will be an appreciable change in the average temperature controlled by the regulator.

The alternating additional movement which is introduced between the contacts 7 by the bimetal element 1 operates to reduce the rate of change of the regulated temperature by the heating element 14 and thereby to reduce the tendency of the regulator to over-run. With a rating of heater 14 sufficient for causing sufficiently rapid heating up to the normal operating temperatures the effective rating of the heater is reduced when the range of normal operating temperatures is reached since up to said range the contacts 7 will be permanently closed but at or near the normal operating temperature the contact 7 will be only intermittently closed due to the operation of the bimetal element 1 and therefore the average heating effected by the heater 14 is reduced.

The bimetal element 1 may also be arranged to reduce the difference between the magnitude of the regulated temperature (or other quantity) at which the main responsive element 6 causes the contacts 7 to occupy their extreme relative positions; this difference may be negligible in regulators in which snap action is not provided with the contacts but in regulators in which snap action is provided as is usually necessary in order that the contacts 7 may handle sufficient current for convenient application to the means governing the regulated quantity, for example the heater circuit 14, the necessary snap action will result in an appreciable difference between said temperatures (or other quantities). This difference is known as the differential of the regulator.

It will thus be seen that where the additional contact movement effected by the element 1 is not provided or is only just sufficient to compensate for the differential, the thermostat, whilst being capable of regulating the temperature closely to the desired value when the arrangement of the controlled circuit such as 14 is such as to produce slow rates of change in the regulated quantity, may have considerable over-run when the controlled circuit produces higher rates of change of the regulated quantity, as, for example, in temperature controlling systems in which the rating of the heater is considerably greater than required for maintaining the required temperature. The provision of the additional movement either in a regulator which inherently has no appreciable differential or to a regulator with appreciable differential and to an extent sufficient to more than compensate for the differential, will increase the switching frequency and thus reduce the rate of change of the regulated quantity by the regulator.

With such additional movement sufficient to reduce the rate of change of the regulated quantity by the controlled circuit, however, the change in the mean position of the responsive system necessary to change the on/off ratio of the controller between its limiting values, infinity and zero, with corresponding change in the input to the means determining the magnitude of the regulated quantity will correspond with an appreciable and often undesirably large change in the magnitude of the regulated quantity, with corresponding changes in the mean position of the responsive system and magnitude of the regulated quantity upon change in the condition affecting said quantity.

Figure 2:
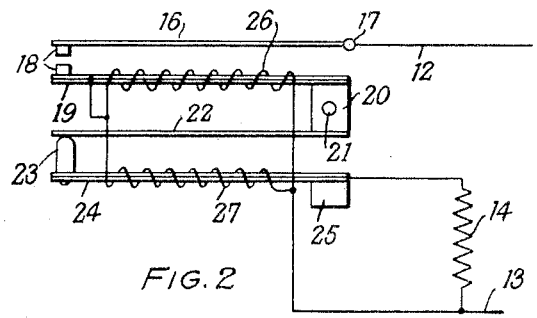
Figure 2 is a diagrammatic view of a modification, showing a different arrangement of the elements of the regulator.

The bimetal element 1 therefore operates so as to reduce the differential and/or reduce the over-run of the regulator but in accomplishing these improvements in the operation causes an appreciable change in the temperature or other regulated quantity upon change in the loading. In the arrangement according to the invention, as shown in Fig. 2, however, the bimetal element is provided and arranged to compensate for this change.

The bimetal element 2 is arranged with a greater thermal capacity than the element 1 and will take up a substantially steady mean position determined by the average energy supplied to the element 1 by the heating coil 8, since the heating coils 3 and 9 are connected so as to be energised at the same times as one another, in the example illustrated by being connected in parallel with one another, although said coils may equally well be connected in series with one another.

Thus, the temperature setting of the thermostat depends upon the position of the lower contact 7 in relation to the fixed part of the thermostat. As hereinbefore explained, due to the operation of the bimetal 1 and heater coil 8 alternately to open and close the contacts 7 independently of the element 6 the change in position of the blade 5, necessary to obtain a given change of the on/off ratio of the contact 7, is increased. The coil 9 receives an average energy which is proportional to said on/off ratio, and will therefore tend to move the lower contact 7 upwardly as said on/off ratio increases. Said on/off ratio increases when the temperature produced by the heater 14 falls and it will therefore be seen that the second bimetal element 2 and associated coil 9 operate so as to increase the setting of the thermostat as the temperature produced by said element 14 falls whereby the change of temperature maintained by the thermostat will be compensated.

With such an arrangement snap action will usually be provided for the contacts, for example by means of a U-shaped permanent magnet shown in section at 15a carried by the bimetal element 2 with the poles of said magnet disposed one on each side of said element adjacent the contacts, an armature 15b extending across these poles being carried by the bimetal element 1, although any other suitable form of snap action switch may be employed. Where snap action is employed the compensating movement is not required to be effective when the displacement of the element 1, that is the auxiliary movement actually occurring, is not greater than the differential of the regulator. Consequently in carrying out the invention means may be provided whereby the compensating movement of the element 2 is terminated when the displacement of the first element is less than the differential. This result may be achieved in various ways, for example by suitable design of the second or compensating element and the heating arrangements therefor, the shape of the displacement-power input curve of said element may be made such that the displacement terminates more or less sharply where it becomes equal to the difference between the displacement of the first element and the distance corresponding with the differential of the regulator, or a mechanical stop as indicated at 15c may be provided for limiting the upward movement of the compensating element 2.

Fig. 2 shows a modification in which a main responsive element 16 pivoted at 17, carries at its free end one contact of a pair of co-operating contacts 18 the other contact of which is mounted on the free end of a bimetal element 19 which corresponds with the element 1 of Fig. 1. It will be understood that the element 16 is represented diagrammatically and will be arranged for actuation in any suitable manner by means responsive to the magnitude of the regulated quantity, for example by an element 6 and biasing spring 6a as in Fig. 1. This bimetal element is secured to a block 20 pivoted at 21. Said block also has secured to it a rigid blade 22 the free end of which is engaged by a peg 23 carried by the free end of a second bimetal element 24 which is rigidly mounted at 25 and corresponds with the element 2 of Fig. 1. The supply conductors are again indicated at 12 and 13 and the main heating element at 14, whilst the elements 19 and 24 are provided with heating coils 26 and 27 which are connected in parallel with one another between the bimetal element 19 and the supply conductor 13.

The elements 19 and 24 are arranged to move their free ends downwardly and upwardly respectively upon heating of their associated coils 26 and 27, and it will be seen that the element 24 operates by pivoting the blade 19 to alter the setting of the thermostat in accordance with the on/off ratio of the contacts 18 whereby operation similar to that of Fig. 1 will be obtained.

Figure 3:
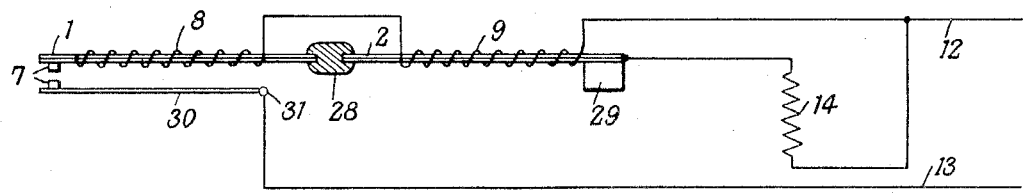
Figure 3 is a diagrammatic view showing another arrangement of the elements of the regulator.

In the embodiment shown in Fig. 3 a pair of bimetal elements 1 and 2 corresponding with the elements 1 and 2 of Fig. 1 are secured together by means of a member 28, the pair of elements being rigidly secured at 29, whilst the outer end of the element 1 carries one of a pair of co-operating control elements, such as contacts 7, the other element of which is carried by an arm or blade 30 which is pivoted at 31 and is connected with the main temperature responsive element of the thermostat, being arranged similarly to the blade 16 of Fig. 2.

The elements 1 and 2 are provided respectively with heating coils 8 and 9 which, in the example illustrated, are connected in series with one another between the supply conductor 12 and the element 1, the blade 30 being connected with the conductor 13 and the main heater 14 being connected between the conductor 12 and the member 29.

In this embodiment of the invention the circuit for the heater element 14 proceeds from the conductor 12 through the elements 1 and 2, the contact 7 and the blade 30 to the other conductor 13, whilst a parallel circuit extends from the conductor 12 to the blade 1 through the heater coils 8 and 9. The element 1 is arranged as in the preceding embodiments of the invention to tend to open the contacts 7 upon heating, that is to say, the left-hand end of the element 1 bends upwardly upon heating whilst the element 2 moves in the opposite direction, namely, moves its left-hand end downwardly upon heating whereby the element 2 will operate in the same manner as in the arrangement of Fig. 1.

Figure 4:
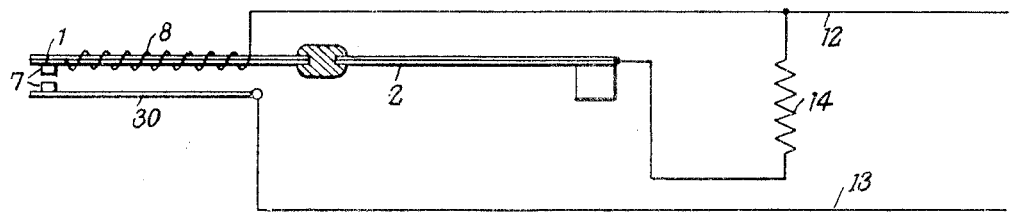
Figure 4 is a view of a regulator similar to that shown in Fig. 3, but showing another heating arrangement for one of the elements.

Fig. 4 indicates a modification of the arrangement of Fig. 3 in which the element 2 instead of being provided with an associated heating coil is arranged to be heated by conduction from the element 1, being proportioned so as to assume a position dependent upon the mean temperature of the element 1. The operation of this arrangement will be similar to that of Fig. 3.

The thermal capacity or time constant of the bimetal element 2 in Figs. 1, 3 and 4, or the element 24 in Fig. 2, is preferably made approximately equal to the time constant of the complete system, comprising the regulator, main heater 14, and enclosure heated by the latter, and various means may be employed for providing adjustability of this time constant, such as by changing the heat capacity of the element 2 or the heat dissipation therefrom, or by changing its thermal relation with the heating means therefor.

Figure 5:
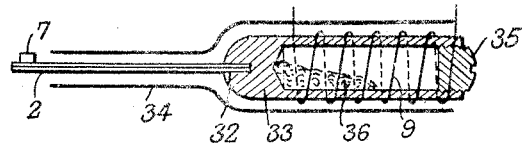
Figures 5 and 6 are views, partly in section, showing means for varying the thermal capacity of one of the elements of the regulator.

Fig. 5 illustrates one convenient arrangement in which the thermal capacity of the element 2 is varied for the above purpose. In the arrangement shown in Fig. 5 the bimetal element 2 is mounted in a slot at 32 formed in a tubular member 33, round which is wound the heating coil 9 associated with the element 2. The tube 33 and element 2 are enclosed by suitable lagging 34. The tube 33 is provided with a screw-closure cap 35 whereby suitable material may be inserted within the tube 33, the value of said material being adapted to obtain the desired thermal capacity of the complete structure. Said material, which is indicated at 36, may conveniently comprise mercury.

Figure 6:
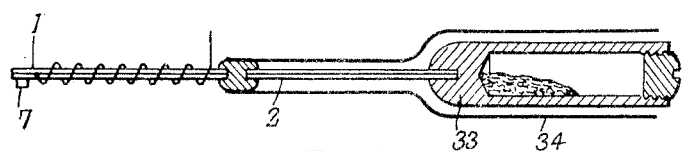

Fig. 6 shows an arrangement of bimetal elements 1 and 2 for use in a system as shown in Fig. 4, when arranged according to Fig. 5. Thus, the second bimetal element 2 is again associated with a tubular member 33, said element and member being enclosed in lagging 34, but instead of the heating winding 9 being provided the element 2 is arranged to be heated by conduction from the element 1 which is provided as in Fig. 4, with a heating winding 8.

The two bimetal elements 1 and 2 or 19 and 24 as the case may be, in the several embodiments of the invention described, since they move in opposite directions can be arranged so as to compensate each other for changes in ambient temperature, or additional bimetal elements may be provided for this purpose as will be apparent to those skilled in the art.

As will be appreciated, where the thermostat is required for regulating air temperature the blade 1 or 19 may constitute the main responsive element, in which case, in the arrangement of Fig. 1, the block 3 will be mounted rigidly, whilst in the arrangement of Figs. 2, 3 and 4 the upper contact 18 or the lower contact 7, as the case may be, will be mounted rigidly in place, but will usually be adjustable.

It will be understood that in the several embodiments of the invention hereinbefore described various modifications may be made, for example any other suitable form of thermal responsive element may be employed in place of the bimetal strips illustrated, whilst said elements may be arranged for electrical heating in any suitable manner, which heating may be controlled by the same contacts as control the main heater 14 as in the drawing, or may be controlled by auxiliary contacts provided for the purpose.

We claim:

1. An automatic electric regulator of the kind referred to comprising cooperating electric control elements, main responsive means responsive to the magnitude of the quantity to be regulated adapted to vary the relative position of said cooperating control elements, electrical means responsive to movement of said control elements into a predetermined cooperating relationship with each other for causing said elements to recede from one another so as to maintain an alternating relative positioning of said control elements varying with the position of said main responsive means, and means responsive to changes in the mean position of said main responsive means for automatically adjusting the position of said main responsive means at which the latter conditions said control elements for a given on/off ratio thereof whereby to maintain a given change in said on/off ratio for a reduced change in the regulated quantity.

2. An automatic electric regulator of the kind referred to comprising cooperating electric control elements, main responsive means responsive to the magnitude of the quantity to be regulated adapted to vary the relative position of said cooperating control elements, electrical means responsive to movement of said control elements into a predetermined cooperating relationship with each other for causing said elements to recede from one another so as to maintain an alternating relative positioning of said control elements varying with the position of said main responsive means, and electrical means responsive to the on/off ratio of said control elements for modifying the relative positioning of the latter in response to changes in the said on/off ratio and thereby to adjust automatically the position of said main responsive means at which the latter conditions said control elements for a given on/off ratio thereof, whereby to maintain a given change in said on/off ratio for a reduced change in the regulated quantity.

3. An automatic electric regulator of the kind referred to comprising cooperating electric control elements, main responsive means responsive to the magnitude of the quantity to be regulated adapted to vary the relative position of said cooperating control elements, electrical means responsive to movement of said control elements into a predetermined cooperating relationship with each other for causing said elements to recede from one another so as to maintain an alternating relative positioning of said control elements varying with the position of said main responsive means, and means for reducing the change in movement of the main responsive means of the regulator necessary to maintain a given change in the on/off ratio of the regulator, comprising a thermally responsive device and a heating circuit for said device including cooperating control elements of the regulator, the thermal capacity of said thermally responsive device being such in relation to the rate of heating thereof by said circuit and the frequency of operation resulting from the additional movement of said control elements as to cause said device to assume a substantially steady position depending upon the on/off ratio of the regulator and therefore upon the mean of the additional relative movement imparted between said control elements.

4. An automatic electric regulator of the kind referred to comprising, a member responsive to the magnitude of the regulated quantity, two thermally responsive devices, cooperating electric control elements responsive to the sum of the displacements of said devices, a heating circuit adapted to heat both said devices and including cooperating control elements of the regulator, one of said thermally responsive devices being adapted to introduce an additional relative movement between said control elements while the other of said thermally responsive devices is proportioned so as to assume a substantially steady displacement depending upon the on/off ratio of said elements and thereby to reduce the change in position of said responsive member necessary to maintain a given change in the on/off ratio of the cooperating control elements of the regulator.

5. An automatic electric regulator of the kind referred to comprising, a member responsive to the magnitude of the regulated quantity, two thermally responsive devices, cooperating electric control elements carried respectively by said devices, a heating circuit adapted to heat both said devices under control of said control elements, means for imparting to one of said thermally responsive devices the movement of said responsive member whereby said one thermally responsive device is adapted to introduce an additional relative movement between said control elements while the other of said thermally responsive devices is proportioned so as to assume a substantially steady displacement depending upon the on/off ratio of said elements and thereby to reduce the change in position of said responsive member necessary to maintain a given change in the on/off ratio of the cooperating control elements of the regulator.

6. An automatic electric regulator of the kind referred to comprising means responsive to the magnitude of a quantity to be regulated, two thermally responsive devices arranged mechanically in tandem with one another and operatively connected with an electric control element, a cooperating control element, and, connected in circuit with said control elements, heating means for said pair of thermally responsive devices, one of said thermally responsive devices having a time constant whereby said one device causes alternate variation in opposite directions of the relative positioning of said cooperating control elements while the other of said thermally responsive devices has a time constant such that said device will assume a substantially steady displacement depending upon the on/off ratio of said control elements thereby to reduce the change in position of said main responsive means necessary to maintain a given change in the on/off ratio of said cooperating control elements.

7. An automatic electric regulator of the kind referred to comprising, a member responsive to the magnitude of the regulated quantity, two thermally responsive devices, cooperating electric control elements responsive to the sum of the displacements of said devices, a heating circuit adapted to heat both of said devices and including cooperating control elements of the regulator, one of said thermally responsive devices being adapted to cause alternate relative movement in opposite directions of said control elements while the other of said thermally responsive devices is proportioned so as to assume a substantially steady displacement depending upon the on/off ratio of said elements and thereby to reduce the change in position of said member necessary to maintain a given change in the on/off ratio of the cooperating control elements of the regulator, said two thermally responsive devices being arranged to produce equal relative movements of said cooperating control elements for similar changes in ambient temperature so as to compensate the operation of said thermally responsive means for variation of ambient temperature.

8. An automatic electric regulator of the kind referred to comprising cooperating electric control elements, main responsive means responsive to the magnitude of the quantity to be regulated adapted to vary the relative position of said cooperating control elements, electrical means responsive to movement of said control elements into a predetermined cooperating relationship with each other for causing said elements to recede from one another so as to maintain an alternating relative positioning of said control elements varying with the position of said main responsive means, and means for reducing the change in movement of said responsive means necessary to maintain a given change in the on/off ratio of the regulator comprising a thermally responsive device and a heating circuit for said device including cooperating control elements of the regulator, the thermal capacity of said thermally responsive device being such in relation to the rate of heating thereof by said circuit and the frequency of operation resulting from the additional movement of said control elements that said device assumes a substantially steady position depending upon the on/off ratio of the regulator and therefore upon the mean of the additional relative movement imparted between said control elements, and disposed in thermal relation with said thermally responsive device for adjusting the setting of the main responsive means of the regulator, an enclosure for containing a removable mass of material, whereby the thermal capacity associated with said thermally responsive device may be adjusted at will.

9. An automatic electric regulator of the kind referred to, comprising a member responsive to the magnitude of the quantity to be regulated, a thermally responsive element movably mounted and mechanically connected with said member, an electrical control element carried by said thermally responsive element, a cooperating electrical control element carried by a second thermally responsive element, and electrical heating means for said thermally responsive elements included in circuit with said control elements whereby one of said thermally responsive elements is adapted to cause alternate variation of the relative positioning of said control elements while the other of said thermally responsive elements has a larger thermal capacity than the first thermally responsive element and is thereby adapted to assume a substantially steady mean position depending upon the on/off ratio of said elements, thereby to compensate for the change in the magnitude of the regulated quantity upon changes in load of the apparatus controlled by the regulator.

10. An automatic electric regulator of the kind referred to, comprising a member responsive to the magnitude of the quantity to be regulated, an electrical control element carried by said member, a thermally responsive element carrying a cooperative control element and movably mounted on means dapted to receive the movement of a second thermally responsive element, electrical heating means for said thermally responsive elements included in circuit with said cooperating control elements whereby one of said thermally responsive elements is adapted to cause alternate variation of the relative positioning of said control elements while the other of said thermally responsive elements has a thermal capacity such as to cause said element to assume a substantially steady mean position depending upon the on/off ratio of said control elements and thereby compensate for the change in the magnitude of the regulated quantity upon change in load of the apparatus controlled by the regulator.

11. An automatic electric regulator of the kind referred to, comprising a member responsive to the magnitude of the quantity to be regulated, a control element carried by said member, a cooperating control element carried by one end of a thermally responsive element the other end of which is rigidly connected with one end of a second thermally responsive element which is supported at its other end, and electrical heating means for said thermally responsive elements included in circuit with said cooperating control elements whereby one of said thermally responsive elements is adapted to cause alternate variation of the relative positioning of said control elements while the other of said thermally responsive elements has a thermal capacity such as to cause said element to assume a substantially steady mean position depending upon the on/off ratio of said elements thereby to compensate for the change in the magnitude of the regulated quantity upon changes in load of the apparatus controlled by the regulator.

12. An automatic electric regulator for operation as a thermostat comprising a thermally responsive element, an electrical control element carried by said thermally responsive element, a cooperating control element carried by a second thermally responsive element, and electrical heating means for said thermally responsive elements included in circuit with said cooperating control elements, whereby the first said thermally responsive element is adapted to cause alternate variation of the relative positioning of said cooperating control elements, while the second said thermally responsive element has a larger thermal capacity than said first thermally responsive element and is thereby adapted to assume a substantially steady mean position depending upon the on/off ratio of said elements thereby to compensate for the change in the magnitude of the regulated quantity upon change in load of the apparatus controlled by the regulator, one of said thermally responsive elements, being arranged to respond to temperature, to be controlled by the regulator.

13. An automatic electric regulator for operation as a thermostat, comprising a normally fixed electrical control element, a thermally responsive element carrying a cooperating control element and movable mounted on means mechanically connected with a second thermally responsive element so as to receive the movement of said second element, and electrical heating arrangements for said thermally responsive means included in circuit with said cooperating control elements, whereby one of said thermally responsive elements is adapted to cause alternate variation of the relative positioning of said control elements while the other of said thermally responsive elements has a larger thermal capacity than said first thermally responsive element and is thereby adapted to assume a substantially steady mean position depending upon the on/off ratio of said cooperating control elements, and one of which thermally responsive elements is arranged to respond to external temperatures thereby to cause the regulator to operate as a thermostat, in which the change in magnitude of the regulated temperature upon change in load will be compensated by said thermally responsive element of larger thermal capacity.

14. An automatic electric regulator for use as a thermostat, comprising an electrical control element, a cooperating control element carried by one end of a thermally responsive element the other end of which is rigidly connected with one end of a second thermally responsive element supported at its other end and electrical heating arrangements for said thermally responsive elements included in circuit with said cooperating control elements, whereby one of said thermally responsive elements is adapted to cause alternate variation of the relative positioning of said control elements while the other of said thermally responsive elements has a larger thermal capacity than said first thermally responsive element and is thereby adapted to assume a substantially steady mean position depending upon the on/off ratio of said cooperating control elements, and one of which thermally responsive elements is arranged to respond to external temperatures thereby to cause the regulator to operate as a thermostat, in which the change in magnitude of the regulated temperature upon change in load will be compensated by said thermally responsive element of larger thermal capacity.

NEVILLE RYLAND DAVIS.
JAMES NEWTON WETHERILT.